(12) United States Patent
Wang et al.

(10) Patent No.: US 12,412,102 B2
(45) Date of Patent: Sep. 9, 2025

(54) INTERACTIVE FEATURE ENGINEERING IN AUTOMATIC MACHINE LEARNING WITH DOMAIN KNOWLEDGE

(71) Applicant: International Business Machines Corporation, Armonk, NY (US)

(72) Inventors: Dakuo Wang, Cambridge, MA (US); Udayan Khurana, White Plains, NY (US); Daniel Karl I. Weidele, Cambridge, MA (US); Arunima Chaudhary, Boston, MA (US); Carolina Maria Spina, Olavarria (AR); Abel Valente, Villa Elisa (AR); Chuang Gan, Cambridge, MA (US); Horst Cornelius Samulowitz, Armonk, NY (US); Lisa Amini, Weston, MA (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 17/317,242

(22) Filed: May 11, 2021

(65) Prior Publication Data

US 2022/0366269 A1 Nov. 17, 2022

(51) Int. Cl.
*G06N 5/022* (2023.01)
*G06F 18/211* (2023.01)
*G06F 18/214* (2023.01)
*G06N 20/00* (2019.01)

(52) U.S. Cl.
CPC ........... *G06N 5/022* (2013.01); *G06F 18/211* (2023.01); *G06F 18/214* (2023.01); *G06N 20/00* (2019.01)

(58) Field of Classification Search
CPC ...... G06N 5/022; G06N 20/00; G06F 18/211; G06F 18/214
See application file for complete search history.

(56) References Cited

U.S. PATENT DOCUMENTS

| 6,577,304 | B1 | 6/2003 | Yablonski et al. |
| 8,839,133 | B2 | 9/2014 | Abeln et al. |
| 9,229,952 | B1 | 1/2016 | Meacham et al. |
| 11,379,710 | B2 | 7/2022 | Wang et al. |

(Continued)

OTHER PUBLICATIONS

Galhotra, S., et al., "KAFE: Automated Feature Enhancement for Predictive Modeling using External Knowledge", 33rd Conference on Neural Information Processing Systems (NeurIPS 2019), Dec. 2019, 8 pages.

(Continued)

*Primary Examiner* — Sherrod L Keaton
(74) *Attorney, Agent, or Firm* — Scully, Scott, Murphy & Presser, P.C.; Caleb Wilkes

(57) ABSTRACT

A dataset including features and values associated with the features can be received. Each of the features in the dataset can be mapped to a corresponding node in a knowledge graph based on the concept represented by the corresponding node. The knowledge graph can be traversed to find a candidate node connected to at least one mapped node, the candidate node not being mapped to a feature in the dataset. A concept associated with the candidate node can be identified as a new feature. A machine learning model pipeline can use the features in the dataset and the new feature to select a subset of features for training a machine learning model.

21 Claims, 11 Drawing Sheets

(56) References Cited

U.S. PATENT DOCUMENTS

| | | | |
|---|---|---|---|
| 2010/0070426 | A1 | 3/2010 | Aymeloglu et al. |
| 2020/0134058 | A1* | 4/2020 | Liu ..................... G06F 16/2379 |
| 2020/0250562 | A1* | 8/2020 | Bly .................. G06F 16/24578 |
| 2020/0272909 | A1 | 8/2020 | Parmentier et al. |
| 2021/0064666 | A1 | 3/2021 | Wang et al. |
| 2021/0065048 | A1 | 3/2021 | Salonidis et al. |
| 2021/0271956 | A1 | 9/2021 | Wang et al. |
| 2021/0271966 | A1 | 9/2021 | Wang et al. |
| 2021/0304028 | A1 | 9/2021 | Weidele et al. |
| 2022/0004914 | A1 | 1/2022 | Kirchner et al. |
| 2022/0043978 | A1 | 2/2022 | Wang et al. |
| 2022/0044136 | A1 | 2/2022 | Wang et al. |

OTHER PUBLICATIONS

Heer, J., et al., "Agency plus automation: Designing artificial intelligence into interactive systems" Proceedings of the National Academy of Sciences (PNAS), Feb. 5, 2019, pp. 1844-1850, vol. 116, No. 6.

Ono, J.P., et al. "PipelineProfiler: A Visual Analytics Tool for the Exploration of AutoML Pipelines", IEEE Transactions on Visualization and Computer Graphics, Feb. 2021, pp. 390-400. vol. 27, No. 2.

Sparks, E.R., et al., "KeystoneML: Optimizing Pipelines for Large-Scale Advanced Analytics", arXiv:1610.09451v1, Oct. 29, 2016, 15 pages.

Khurana, U., et al., "Cognito: Automated Feature Engineering for Supervised Learning", 2016 IEEE 16th International Conference on Data Mining Workshops (ICDMW), Dec. 2016, pp. 1304-1307.

Wang, D., et al., "Human-AI Collaboration in Data Science: Exploring Data Scientists' Perceptions of Automated AI", arXiv:1909.02309v1, Sep. 5, 2019, Proc. ACM Hum.-Comput. Interact., Publication date Nov. 2019, 24 pages, vol. 3, No. CSCW, Article 211.

Drozdal, J., et al., "Trust in AutoML: Exploring Information Needs for Establishing Trust in Automated Machine Learning Systems", arXiv:2001.06509v1, Jan. 17, 2020, IUI '20, Mar. 17-20, 2020, 11 pages.

Wang, D., et al., "AutoAI: Automating the End-to-End AI Lifecycle with Humans-in-the-Loop", IUI '20 Companion, Mar. 17-20, 2020, pp. 77-78.

Wang, D., et al., "AutoDS: Towards Human-Centered Automation of Data Science", arXiv:2101.05273v1, Jan. 13, 2021, CHI Conference on Human Factors in Computing Systems (CHI '21), May 8-13, 2021, 12 pages.

Wang, A.Y., et al., "Themisto: Towards Automated Documentation Generation in Computational Notebooks", arXiv:2102.12592v1, Feb. 24, 2021, 29 pages.

Chaudhary, A., et al., "AutoText: An End-to-End AutoAI Framework for Text", 35th AAAI Conference on Artificial Intelligence, 2021, 3 pages.

Pasupat, P., et al., "Compositional semantic parsing on semi-structured tables", arXiv:1508.00305v1, Aug. 3, 2015, 11 pages.

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

INTERACTIVE FEATURE ENGINEERING IN AUTOMATIC MACHINE LEARNING WITH DOMAIN KNOWLEDGE

BACKGROUND

The present application relates generally to computers and computer applications, information visualization, artificial intelligence, automatic machine learning, data science, and more particularly to interactive feature engineering in automatic machine learning (AutoML) with domain knowledge and improvements to machine learning technique.

Automatic artificial intelligence (AutoAI) or Automatic machine learning (AutoML) uses programs and algorithms to automate the end-to-end artificial intelligence workflow. The state-of-the-art AutoML can automatically generate features, select model algorithms, and output trained models. Feature engineering, which is a component of the end-to-end artificial intelligence workflow, selects features for building artificial intelligence or machine learning models. Feature selection can be done manually, for example, a user selecting features based the user's knowledge, or can be done by an automated process. Currently known feature engineering automation applies a set of primitive rules such as square root, principal component analysis (PCA), or like to the existing features in the data set to generate new features, which can be considered static, for example, without considering domain knowledge about the existing features.

BRIEF SUMMARY

The summary of the disclosure is given to aid understanding of a computer system and method of interactive feature engineering in automatic machine learning with domain knowledge, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method and system can be provided. In one or more embodiments, the method and system can perform interactive feature engineering in automatic machine learning with domain knowledge. The method, in one aspect, can include receiving a dataset including features and values associated with the features. The method can also include searching a knowledge graph including nodes and edges connecting two or more of the nodes, a node of the knowledge graph representing a concept and an edge of the knowledge graph representing a relationship between connecting nodes the edge connects. The method can also include mapping each of the features in the dataset to a corresponding node in the knowledge graph based on the concept represented by the corresponding node. The method can also include traversing the knowledge graph to find a candidate node connected to at least one mapped node, the candidate node not being mapped to a feature in the dataset. The method can also include identifying a concept associated with the candidate node as a new feature. A machine learning model pipeline can use the features in the dataset and the new feature to automatically select a subset of features for training a machine learning model.

In another aspect, a method can include receiving a dataset including features and values associated with the features. The method can also include searching a knowledge graph including nodes and edges connecting two or more of the nodes, a node of the knowledge graph representing a concept and an edge of the knowledge graph representing a relationship between connecting nodes the edge connects. The method can also include mapping each of the features in the dataset to a corresponding node in the knowledge graph based on the concept represented by the corresponding node. The method can also include traversing the knowledge graph to find a candidate node connected to at least one mapped node, the candidate node not being mapped to a feature in the dataset. The method can also include identifying a concept associated with the candidate node as a new feature. The method can also include causing the new feature to be presented on a user interface. A machine learning model pipeline can use the features in the dataset and the new feature to automatically select a subset of features for training a machine learning model.

In yet another aspect, a method can include receiving a dataset including features and values associated with the features. The method can also include searching a knowledge graph including nodes and edges connecting two or more of the nodes, a node of the knowledge graph representing a concept and an edge of the knowledge graph representing a relationship between connecting nodes the edge connects. The method can also include mapping each of the features in the dataset to a corresponding node in the knowledge graph based on the concept represented by the corresponding node. The method can also include traversing the knowledge graph to find a candidate node connected to at least one mapped node, the candidate node not being mapped to a feature in the dataset. the candidate node identified in the knowledge graph is threshold distance away from the at least one mapped node. The method can also include identifying a concept associated with the candidate node as a new feature. A machine learning model pipeline can use the features in the dataset and the new feature to automatically select a subset of features for training a machine learning model.

In still another aspect, a method can include receiving a dataset including features and values associated with the features. The method can also include searching a knowledge graph including nodes and edges connecting two or more of the nodes, a node of the knowledge graph representing a concept and an edge of the knowledge graph representing a relationship between connecting nodes the edge connects. The method can also include mapping each of the features in the dataset to a corresponding node in the knowledge graph based on the concept represented by the corresponding node. The method can also include traversing the knowledge graph to find a candidate node connected to at least one mapped node, the candidate node not being mapped to a feature in the dataset. The candidate node identified in the knowledge graph includes a formula for deriving a concept associated with the candidate node. The method can also include identifying a concept associated with the candidate node as a new feature. A machine learning model pipeline can use the features in the dataset and the new feature to automatically select a subset of features for training a machine learning model.

In yet still another aspect, a method can include receiving a dataset including features and values associated with the features. The method can also include searching a knowledge graph including nodes and edges connecting two or more of the nodes, a node of the knowledge graph representing a concept and an edge of the knowledge graph representing a relationship between connecting nodes the edge connects. The method can also include mapping each of the features in the dataset to a corresponding node in the knowledge graph based on the concept represented by the corresponding node. The method can also include traversing the knowledge graph to find a candidate node connected to at least one mapped node, the candidate node not being mapped to a feature in the dataset. The candidate node identified in the knowledge graph includes a formula for deriving, using the feature in the dataset mapped to the candidate node, a concept associated with the candidate node. The method can also include identifying a concept associated with the candidate node as a new feature. A machine learning model pipeline can use the features in the dataset and the new feature to automatically select a subset of features for training a machine learning model.

In an aspect, a method can include receiving a dataset including features and values associated with the features. The method can also include searching a knowledge graph including nodes and edges connecting two or more of the nodes, a node of the knowledge graph representing a concept and an edge of the knowledge graph representing a relationship between connecting nodes the edge connects. The method can also include mapping each of the features in the dataset to a corresponding node in the knowledge graph based on the concept represented by the corresponding node. The method can also include traversing the knowledge graph to find a candidate node connected to at least one mapped node, the candidate node not being mapped to a feature in the dataset. The at least one mapped node includes two or more nodes. The method can also include identifying a concept associated with the candidate node as a new feature. A machine learning model pipeline can use the features in the dataset and the new feature to automatically select a subset of features for training a machine learning model.

In another aspect, a method can include receiving a dataset including features and values associated with the features. The method can also include searching a knowledge graph including nodes and edges connecting two or more of the nodes, a node of the knowledge graph representing a concept and an edge of the knowledge graph representing a relationship between connecting nodes the edge connects. The method can also include mapping each of the features in the dataset to a corresponding node in the knowledge graph based on the concept represented by the corresponding node. The method can also include traversing the knowledge graph to find a candidate node connected to at least one mapped node, the candidate node not being mapped to a feature in the dataset. The method can also include identifying a concept associated with the candidate node as a new feature. The method can also include causing presenting of each of the features in the dataset with a concept of the corresponding mapped node. A machine learning model pipeline can use the features in the dataset and the new feature to automatically select a subset of features for training a machine learning model.

In yet another aspect, a method can include receiving a dataset including features and values associated with the features. The method can also include searching a knowledge graph including nodes and edges connecting two or more of the nodes, a node of the knowledge graph representing a concept and an edge of the knowledge graph representing a relationship between connecting nodes the edge connects. The method can also include mapping each of the features in the dataset to a corresponding node in the knowledge graph based on the concept represented by the corresponding node. The method can also include traversing the knowledge graph to find a candidate node connected to at least one mapped node, the candidate node not being mapped to a feature in the dataset. The method can also include identifying a concept associated with the candidate node as a new feature. The method can also include causing presenting of each of the features in the dataset with a concept of the corresponding mapped node. The method can also include allowing a user to change the presented concept. A machine learning model pipeline can use the features in the dataset and the new feature to automatically select a subset of features for training a machine learning model.

In still another aspect, a method can include receiving a dataset including features and values associated with the features. The method can also include searching a knowledge graph including nodes and edges connecting two or more of the nodes, a node of the knowledge graph representing a concept and an edge of the knowledge graph representing a relationship between connecting nodes the edge connects. The method can also include mapping each of the features in the dataset to a corresponding node in the knowledge graph based on the concept represented by the corresponding node. The method can also include traversing the knowledge graph to find a candidate node connected to at least one mapped node, the candidate node not being mapped to a feature in the dataset. The method can also include identifying a concept associated with the candidate node as a new feature. The method can also include causing presenting of each of the features in the dataset with a concept of the corresponding mapped node, where each of the features in the dataset with a concept of the corresponding mapped node is visualized as a table of features. A machine learning model pipeline can use the features in the dataset and the new feature to automatically select a subset of features for training a machine learning model.

In another aspect, a method can include receiving a dataset including features and values associated with the features. The method can also include searching a knowledge graph including nodes and edges connecting two or more of the nodes, a node of the knowledge graph representing a concept and an edge of the knowledge graph representing a relationship between connecting nodes the edge connects. The method can also include mapping each of the features in the dataset to a corresponding node in the knowledge graph based on the concept represented by the corresponding node. The method can also include traversing the knowledge graph to find a candidate node connected to at least one mapped node, the candidate node not being mapped to a feature in the dataset. The method can also include identifying a concept associated with the candidate node as a new feature. A machine learning model pipeline can use the features in the dataset and the new feature to automatically select a subset of features for training a machine learning model. The method can include training the machine learning model using the subset.

In yet another aspect, a method can include receiving a dataset including features and values associated with the features. The method can also include searching a knowledge graph including nodes and edges connecting two or more of the nodes, a node of the knowledge graph representing a concept and an edge of the knowledge graph representing a relationship between connecting nodes the edge connects. The method can also include mapping each of the features in the dataset to a corresponding node in the knowledge graph based on the concept represented by the corresponding node. The method can also include traversing the knowledge graph to find a candidate node connected to at least one mapped node, the candidate node not being mapped to a feature in the dataset. The method can also include identifying a concept associated with the candidate node as a new feature. The method can also include providing an interactive user interface for allowing a user to modify the new feature. A machine learning model pipeline can use the features in the dataset and the new feature to automatically select a subset of features for training a machine learning model.

A system comprising a processor and a memory device, where the processor is configured to perform one or more methods described herein can be provided. A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 illustrates an example user interface which shows concepts mapped to features in an embodiment.

FIG. 4 illustrates an example user interface which shows GUI elements, via which a user can revise the automatically generated or presented concepts.

DETAILED DESCRIPTION

A systems and method can be provided, which can automatically generate one or more features for machine learning, for example, for a machine learning model pipeline. In one or more embodiments, the system and/or method use a domain knowledge guided approach and provide an interactive automated feature generation that can accelerate and improve the feature generation process inside an AutoML process, and thus improve machine learning model pipeline or process. Using newly generated features can improve accuracy of machine learning models' outputs. In one or more embodiments, the system and/or method provide an interactive user interface (e.g., graphical user interface) in autoAI and autoML.

Figure 1:
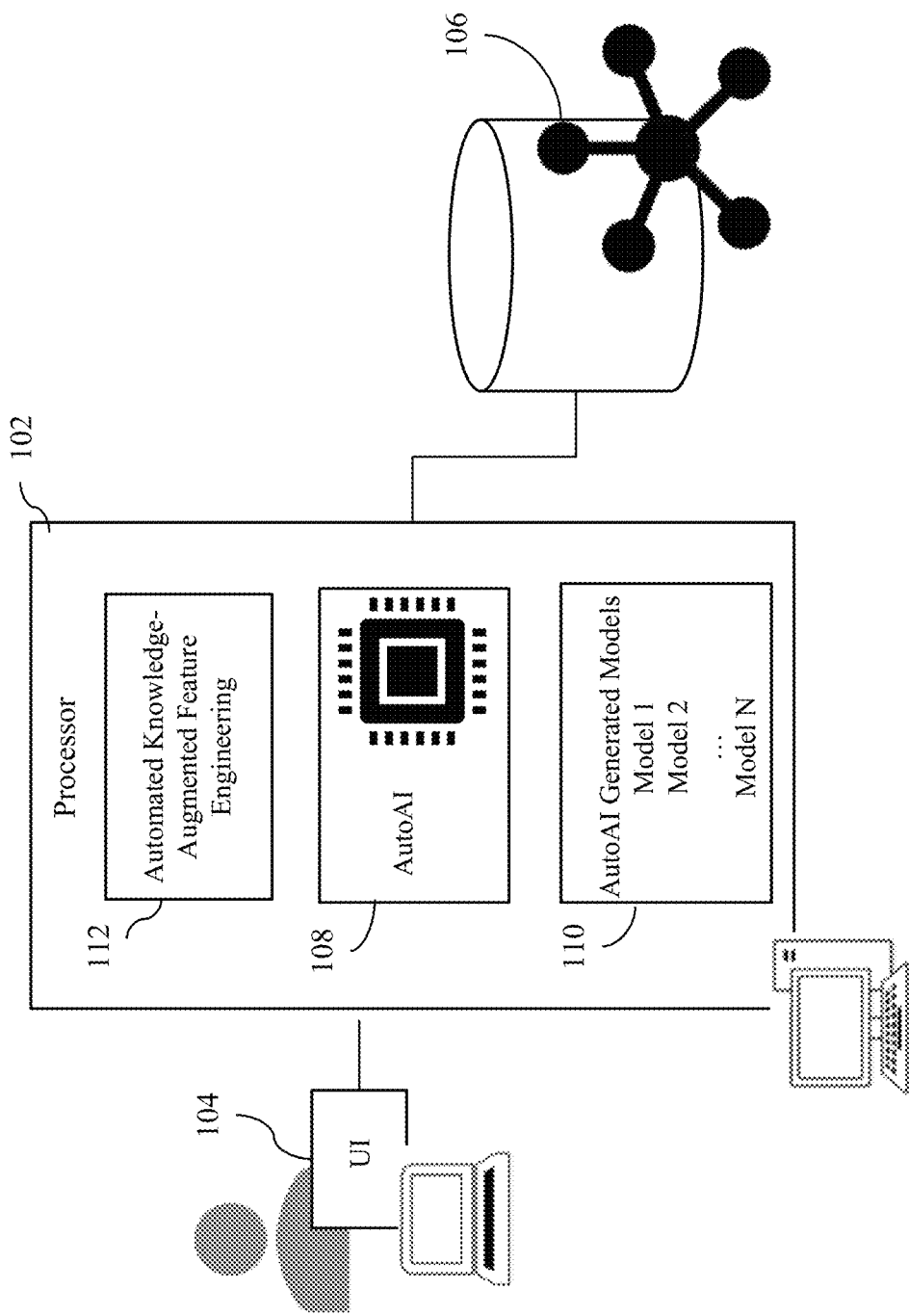
FIG. 1 is diagram illustrating system architecture for interactive feature engineering in an embodiment.

FIG. 1 is diagram illustrating system architecture for interactive feature engineering in an embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, the system can obtain domain knowledge about a dataset using available knowledge graph, which stores information about entities (e.g., objects, concepts) and relationships between and/or among the entities. The system in an embodiment uses the knowledge to automatically generate one or more new features. By way of example, existing features can include body height and weight, and using the knowledge graph, a system in an embodiment can automatically generate a new feature, body mass index (BMI), based on identifying (e.g., by searching the knowledge graph) that existing features, body height and weight, are related to BMI, for example, BMI can be calculated using body height and weight.

A processor 102, for example, which performs automated knowledge augmented feature engineering 112, can receive input dataset. A user, for example, may specify or input such input dataset via a user interface 104. In another embodiment, the processor 102 may receive the input dataset from another automated process. The input dataset contains features (e.g., entities) and their values, which an autoML uses to generate a machine learning model, for example, in a machine learning model pipeline. The input dataset can be received in any form or format, for example, as structured data, unstructured data, and/or other form.

A knowledge graph 106 represents domain knowledge and has a graph-structure topology including nodes and edges. Nodes represent entities (e.g., concepts) and edges connect nodes that are related. Some nodes may include a computation or derivation formula or the like. Such formula can include as components of the formula other entities, for example, represented by related nodes. For example, a node can represent entity, body weight; another node can represent entity, body height; and yet another node can represent entity, BMI. The node representing BMI entity can have or specify a formula that uses body weight and body height to compute BMI. In the knowledge graph 106 these three nodes are connected by edges, representing their relationships or that they are related.

A feature in the input dataset can be represented in a node in the knowledge graph 106, for example, a knowledge graph's node can correspond to a feature in the input dataset. Features can be mapped to nodes (concepts) in the knowledge graph 106, and a closely connected node can be returned as a suggested new feature. For example, the processor 102 may map each feature in the dataset to a node in the knowledge graph. For clarity of explanation only, a node in the knowledge graph which maps to (corresponds to) a feature in the dataset is referred to as a feature node; a node in the knowledge graph which is not mapped to a feature in the dataset is referred to as a non-feature map. The processor 102 searches a knowledge graph for a node (non-feature node) connected or related to a node corresponding to a feature (feature node). For example, a node (non-feature node) that is closely connected to several (for example, two or three) nodes corresponding to features (feature node), can be identified. The processor 102 may determine whether this identified node (representing a certain concept) includes a formula or the like that includes the concepts of the feature nodes. If so, the identified node (its concept or entity represented by the node) is returned as a suggested feature. Whether a node is closely connected to another node can be determined based on a threshold distance between the nodes, e.g., how many edges connect two nodes.

In an embodiment, the processor 102 may present or cause to present concepts corresponding to the features in the dataset and the suggested new feature via a user interface 104. The user interface 104 may allow users to revise the concepts and/or change the suggested new features.

The processor 102, for example running autoAI 108, evaluates and selects the best subset of features among the raw and new features, and generates one or more final machine learning models 110. Examples of machine learning models 110 can include a neural network or any other machine learning models, which use feature data. By way of example, an autoAI 108 can be a hardware such as a special purpose chip for neural network and/or software implementing machine learning pipeline techniques.

The processor 102 can include one or more processors, and the functions shown can be distributed on one or more processors. The user interface (UI) 104 may run on the same processor 102 or another processor, for example, which may be a user device. The knowledge graph can be stored on a storage device, for example, accessible by the processor 102, locally or remotely over a network. The generated models 110 can be stored on a storage device for use.

An example of knowledge graph includes an ontology or dictionary of concepts. For example, each node can represent an entity or concept and information associated with the concept. There can be links in the information, for example, content that explains the concept. For instance, knowledge graph can store interlinked concepts or entities. For example, a web page can represent a node. The web page can include content, for example, one or more other concepts or terms, which can be hyperlinked from the web page.

Figure 2:
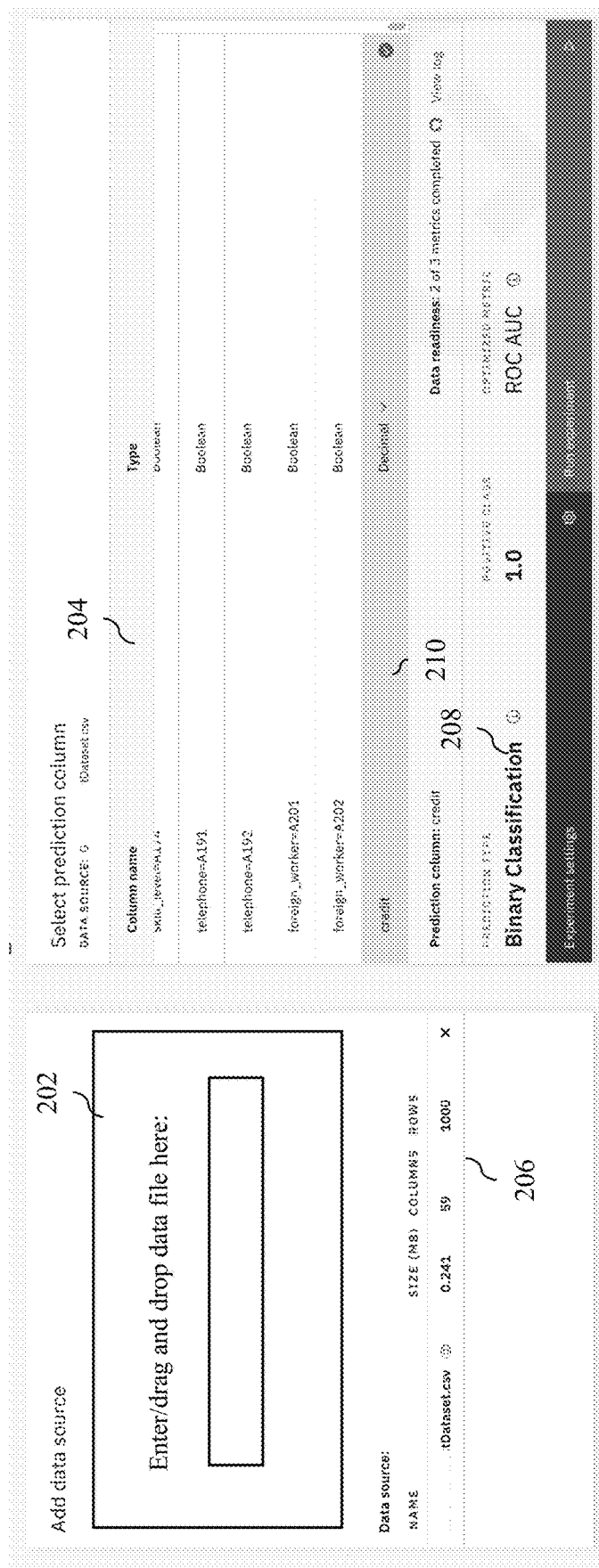
FIG. 2 illustrates an example user interface via which input dataset can be input or uploaded in an embodiment.

FIG. 2 illustrates an example user interface via which input dataset can be input or uploaded in an embodiment. A user may upload an input dataset, for example, via entering into an input field 202. For example, a file containing features and associated values can be uploaded. By way of example, such file can be a spreadsheet having rows and columns, where the columns specify or include features and the rows specify or include values associated with the features of the columns. Dataset in any other file or file format may be received. The user interface shows or presents the features or columns in the input dataset, e.g., at 204. In this example dataset, a processor finds 59 columns (features) with 1000 rows, e.g., as shown at 206. Via the user interface, a user can select a type of a machine learning (ML) model to be built based on the dataset, for example, as shown at 208. In this example, "Binary Classification" type is selected. The user also selects the target, for example, what ML model is to predict. In this example, the "credit" is selected as a target prediction as shown at 210. Other options can be selected for building the model.

The UI can automatically present concepts associated with the features in the dataset. Given the input dataset, for example, a processor may automatically search the knowledge graph and map features to nodes (concepts) in the knowledge graph. Using the mapping of features of the dataset to nodes (or concepts) in a knowledge graph, the concepts corresponding to or mapped to the features can be presented.

Figure 3:
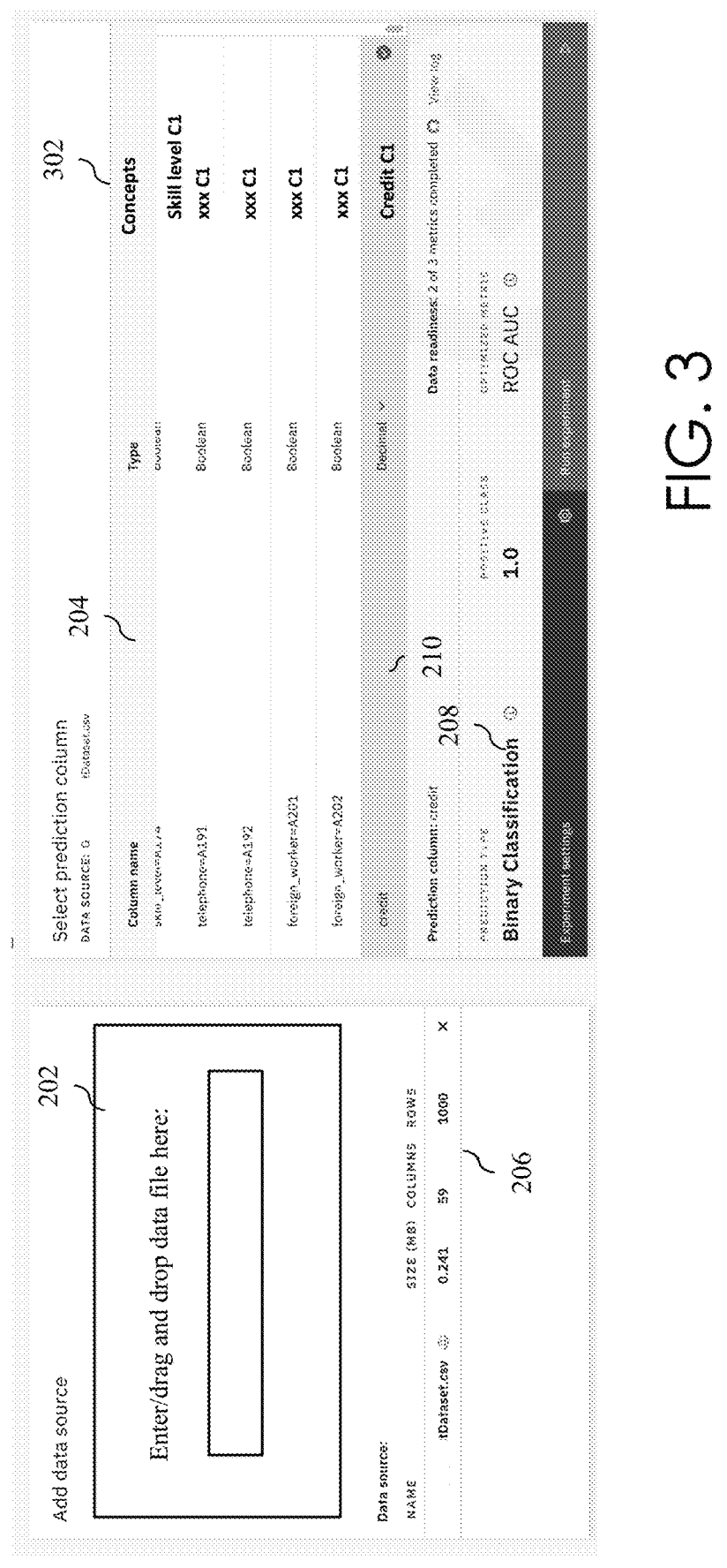

FIG. 3 illustrates an example user interface which shows concepts mapped to features in an embodiment. For example, the features appearing as columns 204 in the dataset are further described with concepts at 302.

Figure 4:
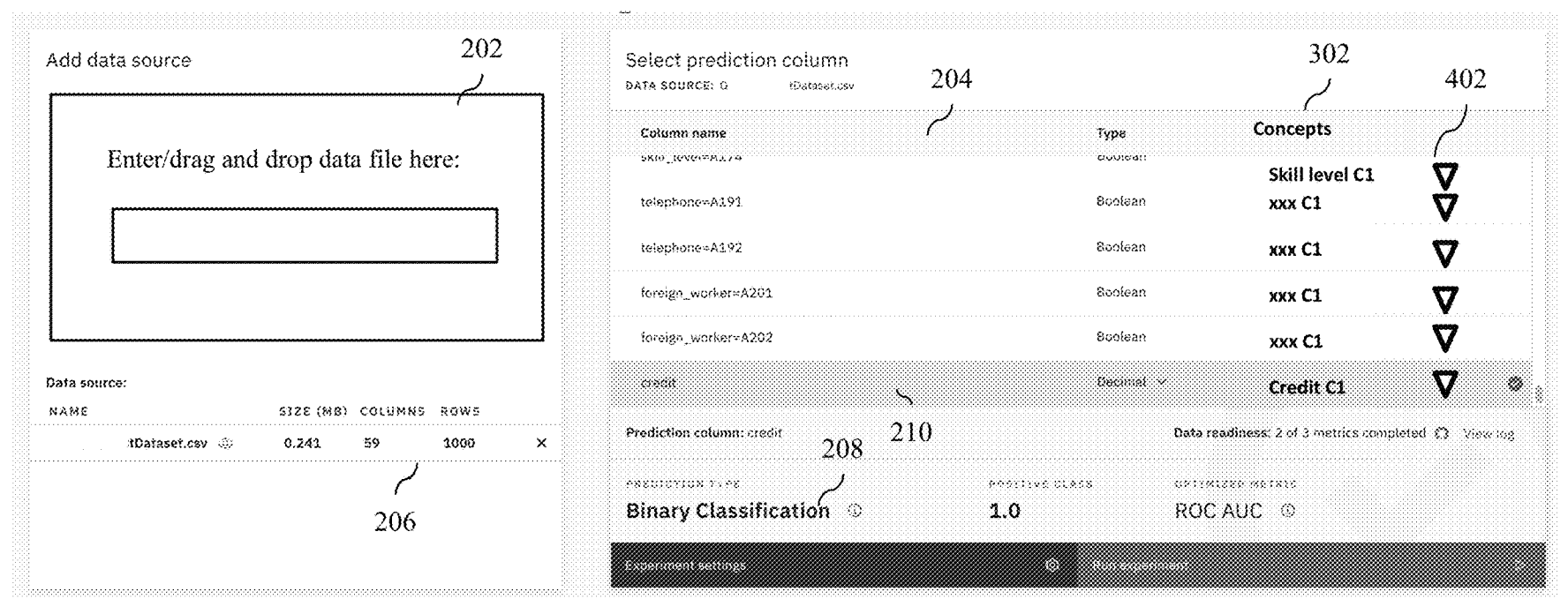

The UI can also allow the user to manually revise concepts 302, which are automatically presented. FIG. 4 illustrates an example user interface which shows GUI elements, via which a user can revise the automatically generated or presented concepts. For example, using UI elements shown at 402, a user may change one or more of the concepts. For instance, the user may select a GUI button or element appearing next to "Skill level C1" concept and change it to "Skill level C2". Similarly, the user may select a GUI button or element appearing next to "xxxC1" concept and change it another concept, e.g., "xxxC3". Other GUI methods can be employed for allowing a user to revise a concept. For instance, the concept itself can be a clickable or editable element, which can be changed.

Figure 5:
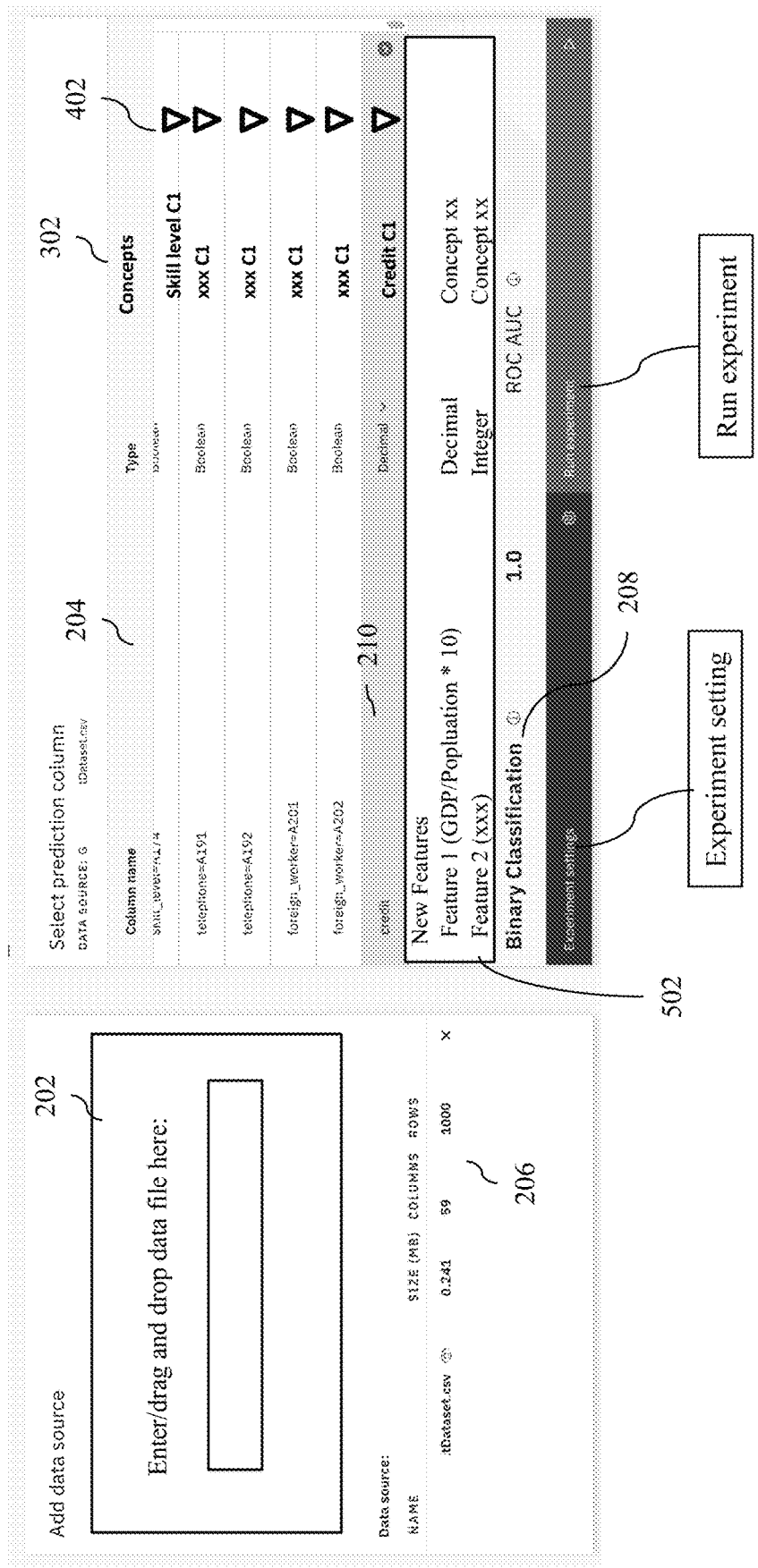
FIG. 5 illustrates an example user interface which shows automatically generated new features, which are generated using existing concepts.

FIG. 5 illustrates an example user interface which shows automatically generated new features, which are generated using existing concepts. For instance, one or more existing concepts can be used based on knowledge from a knowledge graph to generate new features 502. In an embodiment, the user interface can allow a user to change the suggested new features 502, for example, modify the formula, not use a suggested new feature. The user may select a "run" element on the user interface, which may trigger an autoML or autoAI to use the features (e.g., existing and generated) in its processing, for example, to automatically select features for generating an AI to predict the target. For example, the autoML or autoAI evaluates and selects the best subset of features among the raw and new features, and generates one or more machine learning models.

Figure 6:
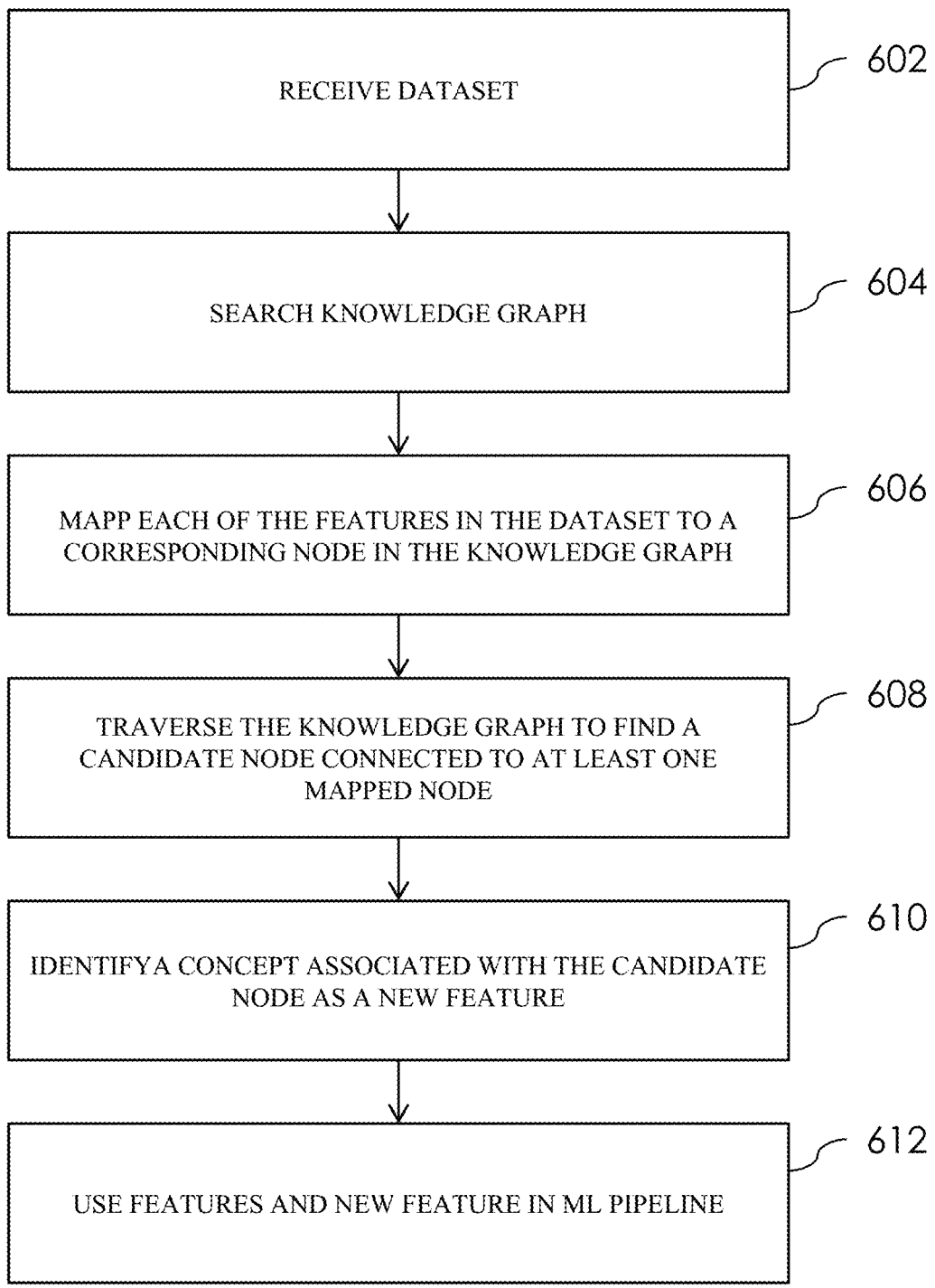
FIG. 6 is a flow diagram illustrating a method in an embodiment. The method can be performed or run by one or more processors.

FIG. 6 is a flow diagram illustrating a method in an embodiment. The method can be performed or run by one or more processors. At 602, a dataset is received. The dataset contains features and associated values of the features.

At 604, a knowledge graph can be searched. The knowledge graph includes nodes and edges connecting two or more of the nodes, a node of the knowledge graph representing a concept and an edge of the knowledge graph representing a relationship between the connecting nodes the edge connects.

At 606, each of the features can be mapped to a concept or a node represented in a knowledge graph. For instance, context or understanding of the features and context or understanding of the nodes (concepts) can be extracted, for example, using a natural language processing technique or another technique, and a feature and a node having matching or similar context can be mapped to one another. Any other known or will be known methods can be used to map a feature with a knowledge graph node. Mapping, for example, can include linking two data structures (e.g., a data structure representing a feature in a dataset and a data structure representing a node of a knowledge graph), for example, using a reference or pointer. Any other known or will be known methods can be used for linking computer-implemented objects or data.

At 608, the knowledge graph can be traversed to find a concept or node (not mapped to a feature of the dataset), which is connected to a node that is mapped to a feature in the dataset, for example, one or more nodes that are mapped to one or more features of the dataset. In an embodiment, finding a concept or node that is connected to a node of a feature (mapped node) can include finding a node that is connected closely, for example, threshold distance away from the mapped node. For example, the shortest path to the candidate node from the mapped node is within a threshold distance. The threshold can be configurable. The threshold, for example, can be 1, for example, the shortest path from the mapped node to a candidate node is 1 edge away, for example, direction connection. As another example, the threshold can be 2, that is the shortest path from the mapped node to a candidate node is via another node in the knowledge graph's network of nodes and edges. Another number can be set as a threshold, which may be configurable. In an embodiment, finding a concept that is connected to a node of a feature (mapped node) can include finding a candidate node or concept that includes a formula. In an embodiment, the formula contains an element, which can include the corresponding feature of the mapped node. In an embodiment, finding a concept or node that is connected to a node of a feature (mapped node) can include finding a node that is connected closely, for example, threshold distance away from the mapped node, and includes a formula. In an embodiment, finding a concept or node that is connected to a node of a feature (mapped node) can include finding a node that is connected closely, for example, threshold distance away from the mapped node, and includes a formula, and the formula contains an element or component, which includes the corresponding feature of the mapped node. In an embodiment, if two or more mapped nodes are connected to a candidate node, the candidate node may contain a formula that includes one or more of the features corresponding to the mapped nodes. In an embodiment, a candidate node from the knowledge graph (not mapped to a feature in the dataset) can be looked for, which connects (or closely connects) to a predefined number of mapped nodes. For example, the predefined number can be 2 or 3. The predefine number can be a configurable number.

At 610, the concept associated with the candidate node is identified as a new feature. The new feature may be suggested, for example, presented to a user. The presentation may list a name for the new feature, the concept associated with the new feature. The presentation may also list the type such as decimal, integer, and/or another type. A formula associated with the new feature can also be presented, for example, a formula which show how the new feature can be derived. In an embodiment, the new feature can be derived using the existing features specified in the dataset.

At 612, a machine learning model pipeline can use the features in the dataset and the new feature to select a subset of features for training a machine learning model. The method can also include training the machine learning model.

In an embodiment, a computing device such as a computer including a processor can automatically generate features associated with a machine learning pipeline. The computing device can receive a dataset for use with a machine learning model. The computing device may present or cause to be presented on a display, one or more visualization of features associated with the dataset. The computing device may generate one or more suggested candidate concepts for each of the visualized features. The concepts can be retrieved from a knowledge graph. The computing device may present or display or caused to be presented or displayed, one or more suggested candidate concepts. The computing device may receive one or more changes from the user regarding the presented or displayed one or more suggested candidate concepts. The computing device can generate one or more new features for the dataset based upon the domain knowledge retrieved from the knowledge graph. The computing device can present or display, or caused to be presented or displayed, one or more new features. The computing device may allow a user to select, change or reject one or more new features. Based on the features and new features, the computing device can generate one or more new machine learning pipeline candidates.

In an embodiment, a method can include using a computing device for automatically generating features using domain knowledge, for example, considering user input dataset. The method can include receiving by a computing device from a user the dataset. The method can also include visualizing, e.g., displaying or presenting (or causing of displaying or presenting) by the computing device, one or more features associated with the dataset. The method can also include dispatching by the computing device to an automated knowledge-augmented feature engineering module (e.g., a feature engineering functionality running on the computing device or another device) the dataset features understanding and extraction. For instance, feature engineering module may search a knowledge graph for information (knowledge) associated with one or more features and identify one or more nodes in the knowledge graph that are linked to the one or more features. The method can also include generating by the computing device a suggested candidate concept for each of the dataset feature. For instance, a candidate concept includes information from a node in the knowledge graph that maps to a feature in the dataset. The method can also include presenting or displaying (or causing of displaying or presenting) by the computing device the suggested candidate concept for each of the dataset feature. Optionally, the method can include receiving by the computing device from the user an action associated with the suggested concept, for example, change in the suggested concept. The method can also include generating by the computing device the one or more suggested new features using the candidate concepts of the dataset. The method can also include presenting or displaying (or causing of displaying or presenting) by the computing device the suggested new features. The method can also include dispatching the updated dataset with the new features to various optimization modules inside an AutoML, system and generating candidate model pipelines based on a priority score. Priority score, for example, can indicate the accuracy or efficiency of the candidate model pipelines in their prediction. The method can also include receiving by the computing device from the user an action of the selected model pipeline and outputting the new selected machine learning model. Briefly, model pipeline can refer to, not only building a model, but also, to data preprocessing involved in building a model, such as data cleansing, feature engineering, e.g., selecting features to use for building a model, and/or other pre- or post-processing involved in building a machine learning model.

Figure 7:
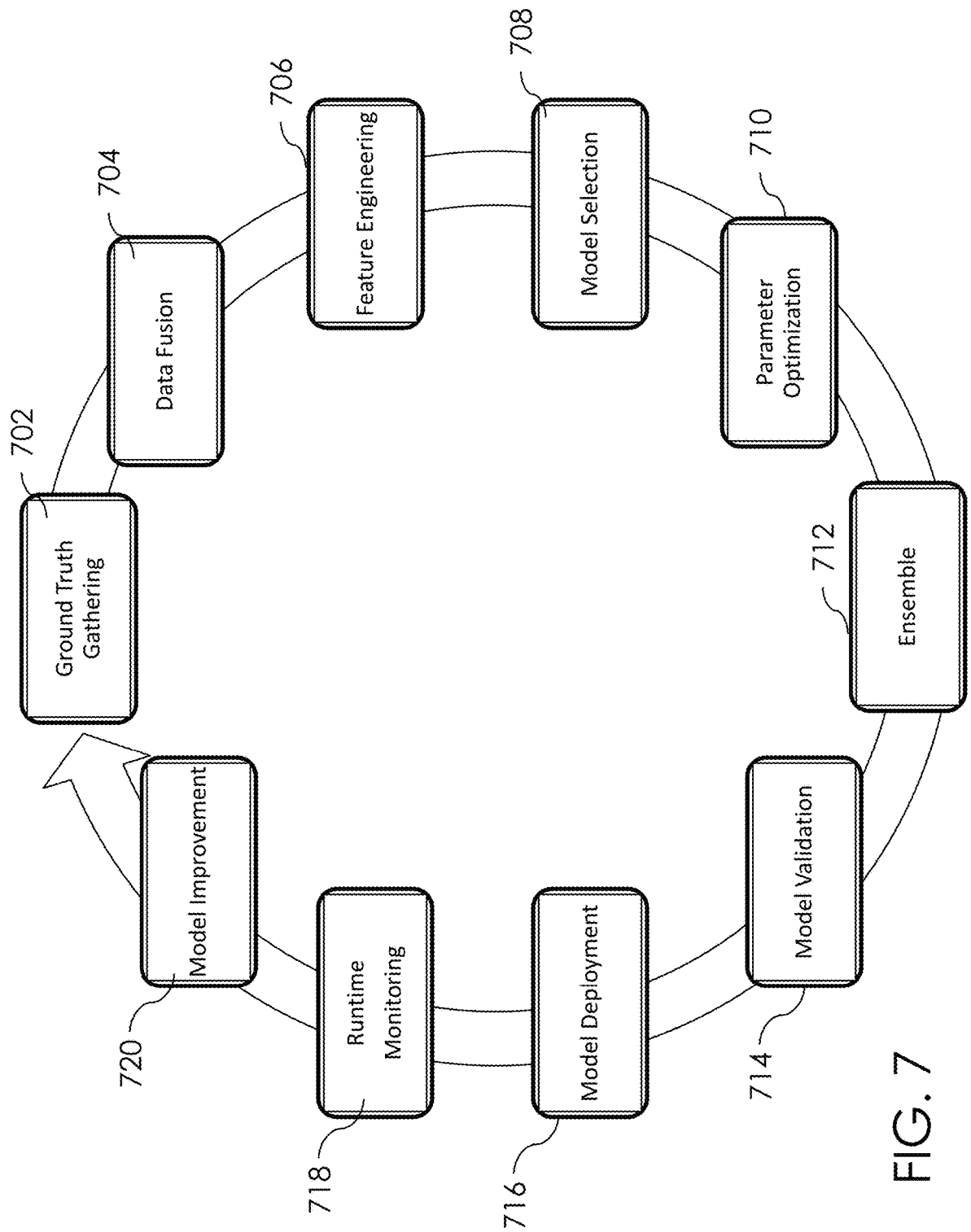
FIG. 7 is a diagram illustrating an end-to-end automatic machine learning lifecycle, including interactive feature engineering disclosed herein in an embodiment.

FIG. 7 is a diagram illustrating an end-to-end automatic machine learning lifecycle, including interactive feature engineering disclosed herein in an embodiment. Ground truth gathering 702 can include collecting data, e.g., features and feature values, which can be selected as input features and one or more target features for prediction, which can be used to training a machine learning model. Data fusion 704 can include pre-processing the ground truth data collected at 702, for example, merging data, removing duplicates, and/or other cleansing of the data for use. Feature engineering 706 can include selecting features for use from the gathered data, and can include automated feature engineering disclosed herein. Model selection 708 can include selecting one or more machine learning models, for example, selecting specific architecture. Parameter optimization 710 can include optimizing parameters (e.g., weights and bias of a machine learning model such as a neural network or another model), for example, via training. Ensemble 712 can include assembling selected models and components for using the model. Model validation 714 can include validate the results of the trained machine learning model. Model deployment 716 can include deploying the model for running in an environment. Runtime monitoring 718 can include monitoring the machine learning model running in the environment with new data. Model improvement 720 can include updating the model to improve its accuracy, for example, based on feedback or additional training data from the environment.

Figure 8:
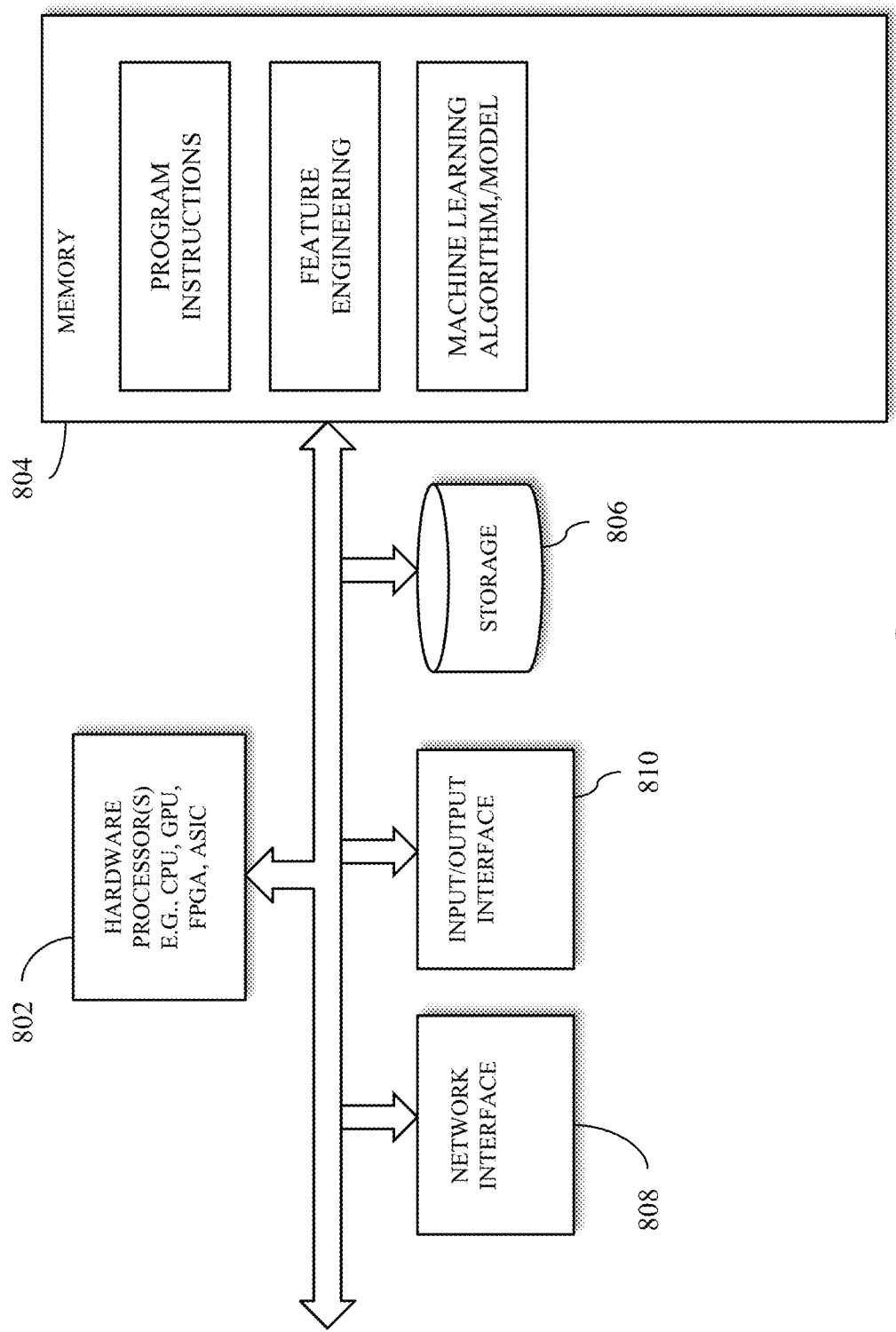
FIG. 8 is a diagram showing components of a system in one embodiment that can perform feature engineering.

FIG. 8 is a diagram showing components of a system in one embodiment that can perform feature engineering. One or more hardware processors 802 such as a central processing unit (CPU), a graphic process unit (GPU), and/or a Field Programmable Gate Array (FPGA), an application specific integrated circuit (ASIC), and/or another processor, may be coupled with a memory device 804, and generate a prediction model and recommend communication opportunities. A memory device 804 may include random access memory (RAM), read-only memory (ROM) or another memory device, and may store data and/or processor instructions for implementing various functionalities associated with the methods and/or systems described herein. One or more processors 802 may execute computer instructions stored in memory 804 or received from another computer device or medium. A memory device 804 may, for example, store instructions and/or data for functioning of one or more hardware processors 802, and may include an operating system and other program of instructions and/or data. One or more hardware processors 802 may receive input dataset including features and associated valued. At least one hardware processor 802 may generate one or more new features based on a knowledge graph storing domain knowledge. Features in the dataset and one or more newly generated features can be used in feature engineering or selecting features for use in training a machine learning model such as a neural network. Input dataset may be stored in a storage device 806 or received via a network interface 808 from a remote device, and may be temporarily loaded into a memory device 804 for feature engineering and/or building or generating the machine learning model. The machine learning model may be stored on a memory device 804, for example, for running by one or more hardware processors 802. One or more hardware processors 802 may be coupled with interface devices such as a network interface 808 for communicating with remote systems, for example, via a network, and an input/output interface 810 for communicating with input and/or output devices such as a keyboard, mouse, display, and/or others.

Figure 9:
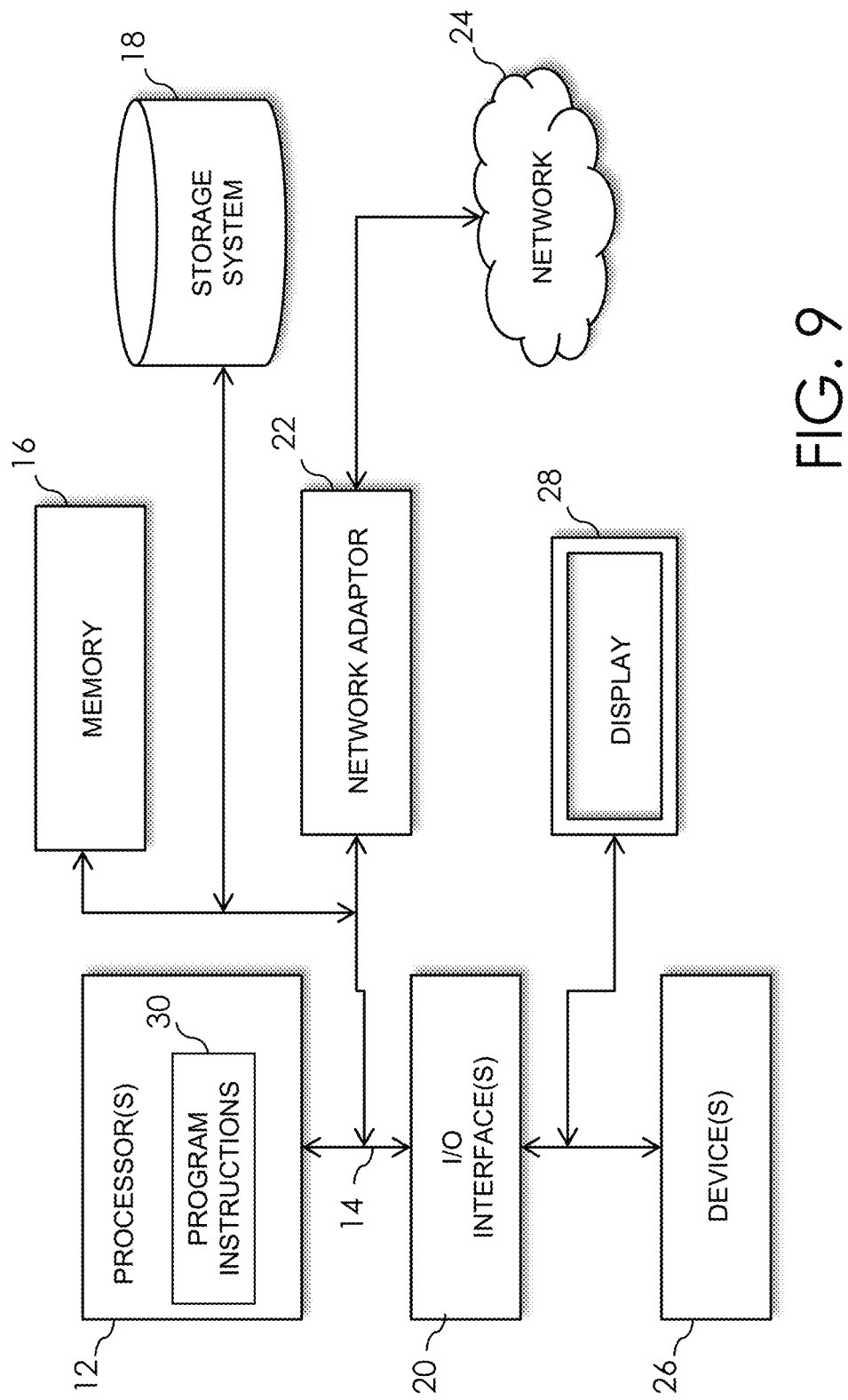
FIG. 9 illustrates a schematic of an example computer or processing system that may implement a system in one embodiment.

FIG. 9 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
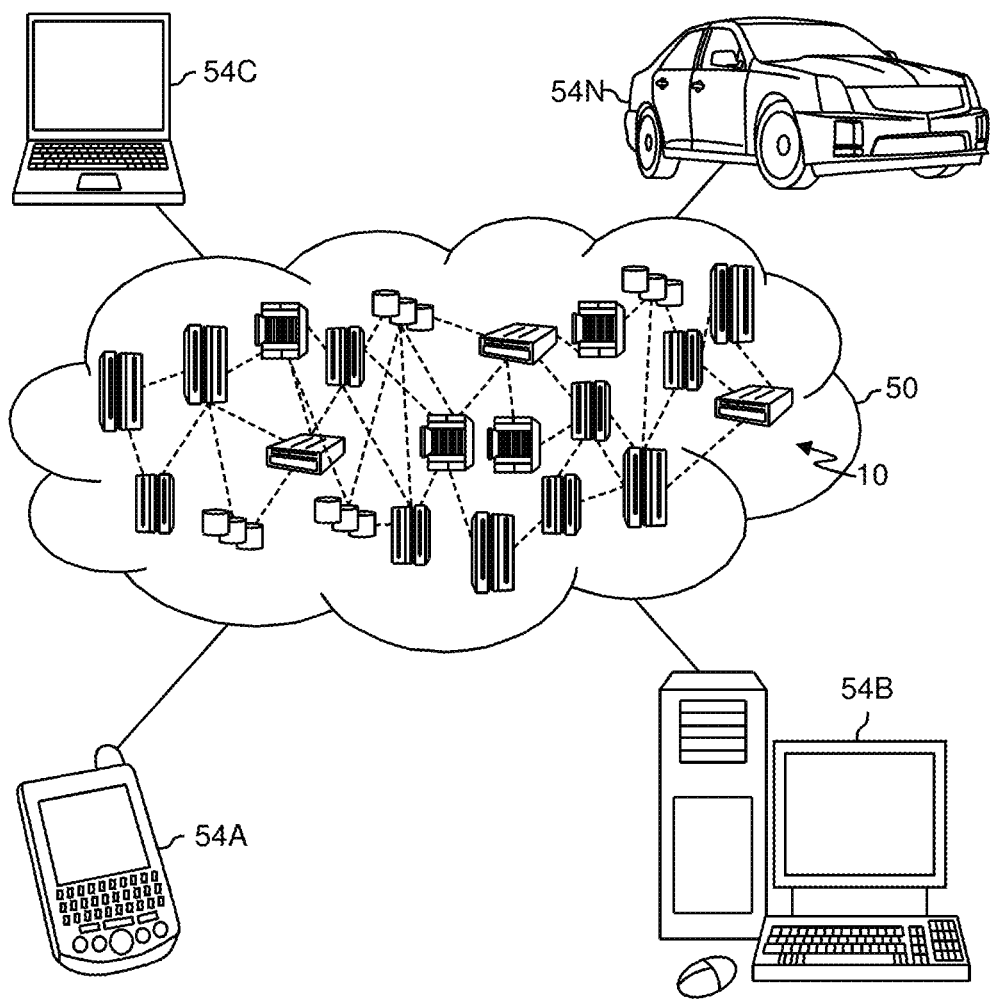
FIG. 10 illustrates a cloud computing environment in one embodiment.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
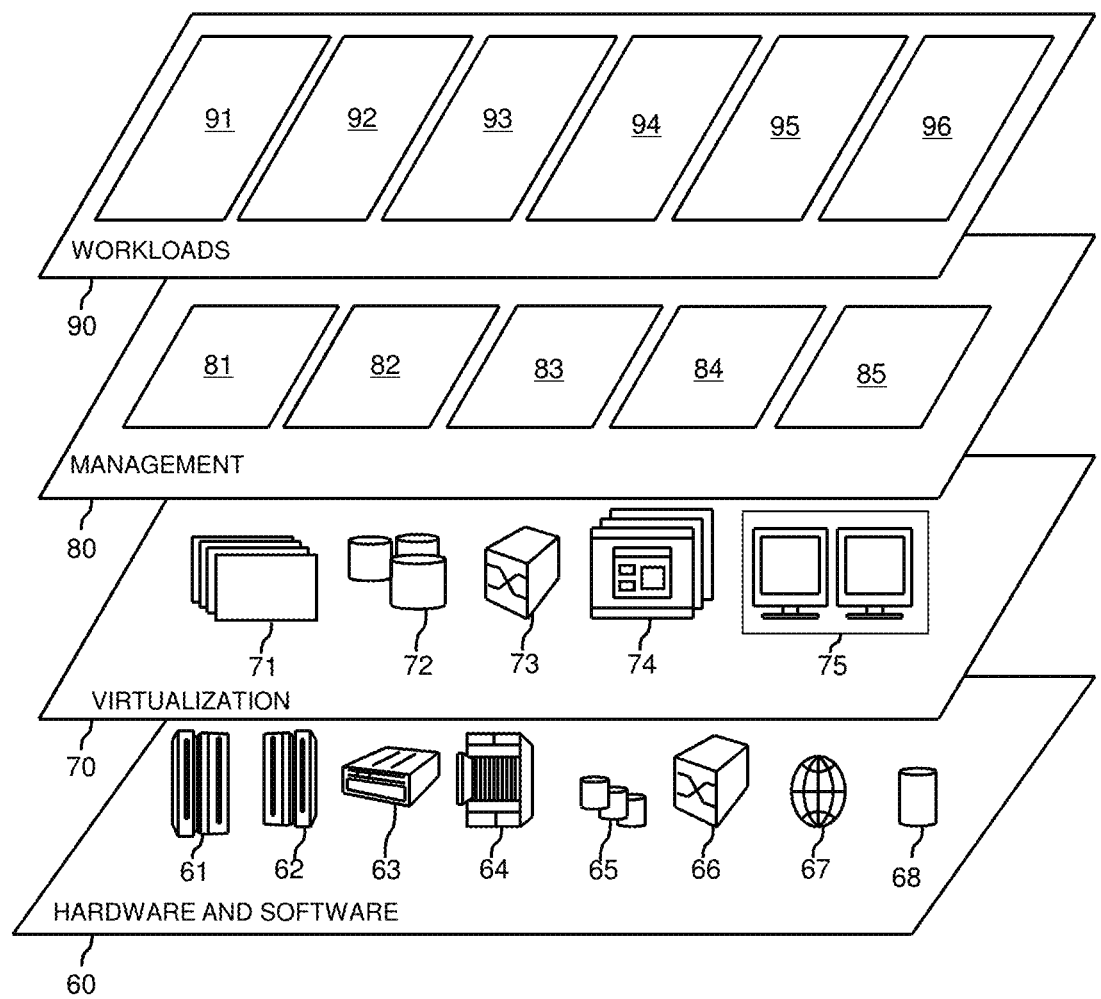
FIG. 11 illustrates a set of functional abstraction layers provided by cloud computing environment in one embodiment of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated feature engineering processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving, by at least one processor performing feature engineering in an automatic machine learning pipeline, a dataset including features;
mapping, by the at least one processor, the features in the dataset to nodes of a knowledge graph, the nodes representing respective concepts, the knowledge graph further including edges connecting the nodes and representing respective relationships between respective two of the nodes that a respective edge connects, wherein the mapping occurs based on the concept represented by the corresponding node;
traversing, by the at least one processor, the knowledge graph to find a candidate node existing in the knowledge graph and connected to at least one mapped node that is mapped to at least one feature in the dataset, the candidate node not being mapped to any of the features in the dataset;
identifying, by the at least one processor, a concept associated with the candidate node as a new feature;
presenting a user interface that includes the new feature and the respective concepts mapped to the features as user-engageable elements that are changeable via user input; and
receiving, via user input into one or more of the user-engageable elements of the user interface, a change for the new feature,
wherein the automatic machine learning pipeline uses the features in the dataset and the changed new feature to select a subset of features for training a machine learning model.

2. The method of claim 1, wherein the candidate node identified in the knowledge graph is a first distance away from the at least one mapped node, the first distance being within a pre-determined threshold.

3. The method of claim 1, wherein the candidate node identified in the knowledge graph includes a formula for deriving a concept associated with the candidate node.

4. The method of claim 1, wherein the candidate node identified in the knowledge graph includes a formula for deriving, using the feature in the dataset mapped to the candidate node, a concept associated with the candidate node.

5. The method of claim 1, wherein the at least one mapped node includes two or more nodes.

6. The method of claim 1, further including causing presenting of each of the features in the dataset with a concept of the corresponding mapped node.

7. The method of claim 6, further including allowing a user to change the presented concept.

8. The method of claim 6, wherein said each of the features in the dataset with a concept of the corresponding mapped node is visualized as a table of features.

9. The method of claim 1, further including training the machine learning model using the subset.

10. A system comprising:
a processor; and
a memory device coupled with the processor;
the processor configured at least to:
receive a dataset including features and values associated with the features in performing feature engineering in an automatic machine learning pipeline;
map the features in the dataset to nodes of a knowledge graph, the nodes representing respective concepts, the knowledge graph further including edges connecting the nodes and representing respective relationships between respective two of the nodes that a respective edge connects, wherein the mapping occurs based on the concept represented by the corresponding node;
traverse the knowledge graph to find a candidate node existing in the knowledge graph and connected to at least one mapped node that is mapped to at least one feature in the dataset, the candidate node not being mapped to any of the features in the dataset;
identify a concept associated with the candidate node as a new feature;
present a user interface that includes the new feature and the respective concepts mapped to the features as user-engageable elements that are changeable via user input; and
receive, via user input into one or more of the user-engageable elements of the user interface, a change for the new feature,
wherein the automatic machine learning pipeline uses the features in the dataset and the changed new feature to select a subset of features for training a machine learning model.

11. The system of claim 10, wherein the candidate node identified in the knowledge graph is a first distance away from the at least one mapped node, the first distance being within a pre-determined threshold.

12. The system of claim 10, wherein the candidate node identified in the knowledge graph includes a formula for deriving the new feature associated with the candidate node.

13. The system of claim 10, wherein the candidate node identified in the knowledge graph includes a formula for deriving the new feature, using the feature in the dataset mapped to the candidate node.

14. The system of claim 10, wherein the at least one mapped node includes two or more nodes.

15. The system of claim 10, wherein the user interface is configured to present each of the features in the dataset with a concept of the corresponding mapped node in a row and column format.

16. The system of claim 15, wherein the user interface allows a user to change the presented concept.

17. The system of claim 15, wherein the user interface is configured to allow a user to modify the new feature.

18. The system of claim 10, wherein the processor is further configured to train the machine learning model using the subset.

19. A computer program product comprising a non-transitory computer readable storage medium having program instructions embodied therewith, the program instructions readable by a device to cause the device to: receive a dataset including features and values associated with the features in performing feature engineering in an automatic machine learning pipeline; map the features in the dataset to nodes of a knowledge graph, the nodes representing respective concepts, the knowledge graph further including edges connecting the nodes and representing respective relationships between respective two of the nodes that a respective edge connects, wherein the mapping occurs based on the concept represented by the corresponding node; traverse the knowledge graph to find a candidate node existing in the knowledge graph and connected to at least one mapped node that is mapped to at least one feature in the dataset, the candidate node not being mapped to any of the features in the dataset; identify a concept associated with the candidate node as a new feature; present a user interface that includes the new feature and the respective concepts mapped to the features as user-engageable elements that are changeable via user input; and receive, via user input into one or more of the user-engageable elements of the user interface, a change for the new feature, wherein the automatic machine learning pipeline uses the features in the dataset and the changed new feature to select a subset of features for training a machine learning model.

20. A system comprising:
a processor; and
a user interface;
the processor configured at least to:
receive a dataset including features and values associated with the features in performing feature engineering in an automatic machine learning pipeline;
map the features in the dataset to nodes of a knowledge graph, the nodes representing respective concepts, the knowledge graph further including edges connecting the nodes and representing respective relationships between respective two of the nodes that a respective edge connects, wherein the mapping occurs based on the concept represented by the corresponding node;
traverse the knowledge graph to find a candidate node existing in the knowledge graph and connected to at least one mapped node that is mapped to at least one feature in the dataset, the candidate node not being mapped to any of the features in the dataset, wherein a shortest path to the candidate node from said at least one mapped node is within a threshold distance and the candidate node includes a formula for deriving a concept of the candidate node; and
identify a concept associated with the candidate node as a new feature;
the user interface configured at least to:
present a user interface that includes the new feature and the respective concepts mapped to the features as user-engageable elements that are changeable via user input; and
receive, via user input into one or more of the user-engageable elements of the user interface, a change for the new feature,
wherein the automatic machine learning pipeline uses the features in the dataset and the changed new feature to select a subset of features for training a machine learning model.

21. A computer-implemented method comprising:
receiving a dataset including features and values associated with the features in performing feature engineering in an automatic machine learning pipeline;
mapping the features in the dataset to nodes of a knowledge graph, the nodes representing respective concepts, the knowledge graph further including edges connecting the nodes and representing respective relationships between respective two of the nodes that a respective edge connects, wherein the mapping occurs based on the concept represented by the corresponding node;
traversing the knowledge graph to find a candidate node existing in the knowledge graph and connected to at least one mapped node that is mapped to at least one feature in the dataset, the candidate node not being mapped to any of the features in the dataset, wherein shortest path to the candidate node from said at least one mapped node is within a threshold distance and the candidate node includes a formula for deriving a concept of the candidate node;
identifying a concept associated with the candidate node as a new feature;
wherein the candidate node identified in the knowledge graph includes a formula for deriving a concept associated with the candidate node;
presenting a user interface that includes the new feature and the respective concepts mapped to the features as user-engageable elements that are changeable via user input; and
receiving, via user input into one or more of the user-engageable elements of the user interface, a change for the new feature,
wherein the automatic machine learning pipeline uses the features in the dataset and the new feature resulting from the interaction via the user interface, to select a subset of features for training a machine learning model.

* * * * *